H. C. MARKOWSKI & H. B. WITTKOWSKI.
COMBINATION STORM SASH AND VENTILATOR.
APPLICATION FILED JUNE 1, 1912.
1,078,205.
Patented Nov. 11, 1913.
2 SHEETS—SHEET 2.
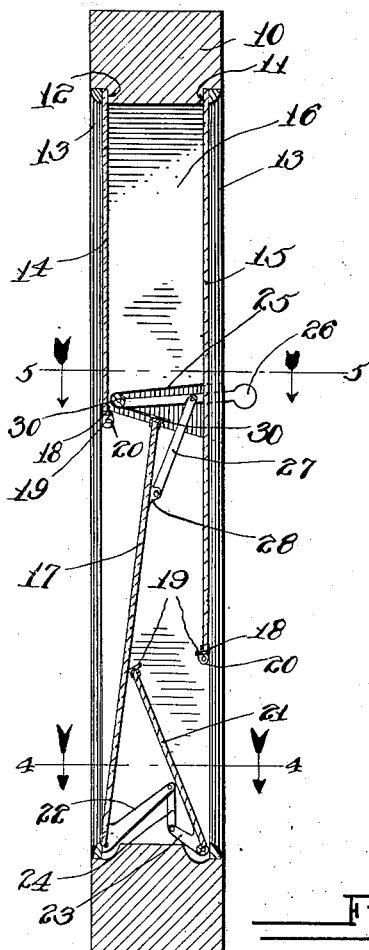
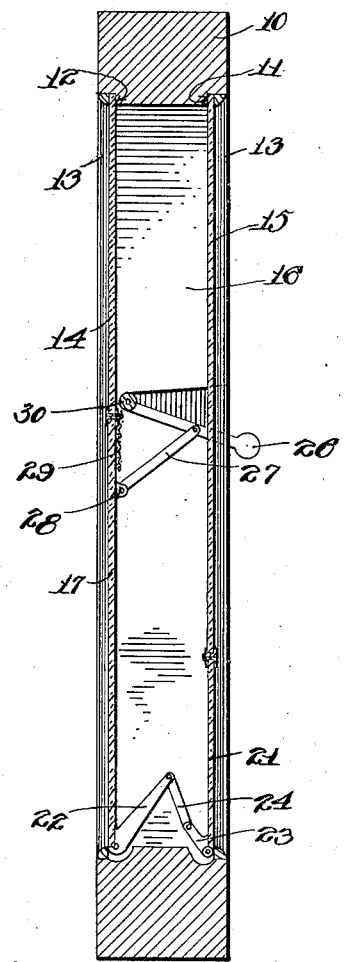
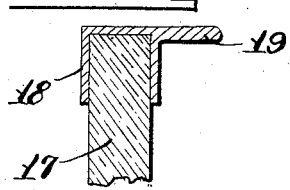
WITNESSES
INVENTORS
Henry C. Markowski
Harry B. Wittkowski
their Attorney.

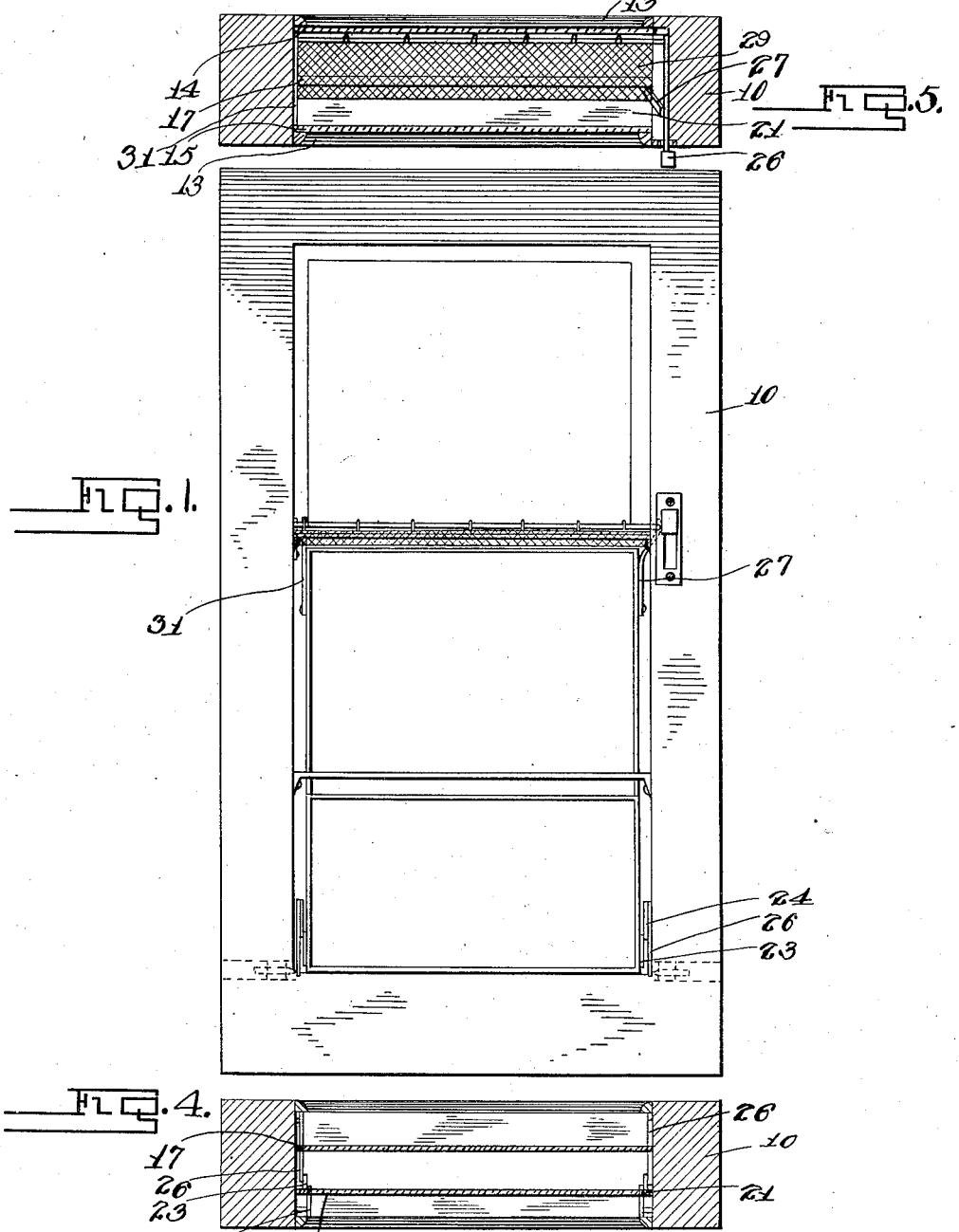

UNITED STATES PATENT OFFICE.

HENRY C. MARKOWSKI AND HARRY B. WITTKOWSKI, OF GRAND RAPIDS, MICHIGAN.

COMBINATION STORM-SASH AND VENTILATOR.

1,078,205.

Specification of Letters Patent.

Patented Nov. 11, 1913.

Application filed June 1, 1912. Serial No. 701,100.

*To all whom it may concern:*

Be it known that we, HENRY C. MARKOWSKI, and HARRY B. WITTKOWSKI, citizens of the United States, residing at Grand Rapids, in the county of Kent and State of Michigan, have invented certain new and useful Improvements in Combination Storm-Sash and Ventilators, of which the following is a specification, reference being had therein to the accompanying drawing.

This invention relates to window construction, and the principal object of the invention is to provide a window which may be opened to permit ventilation without a direct draft being caused. This is accomplished by providing the window with a baffle plate which is pivotally mounted so that it may be swung to open the window thus permitting air to pass over the baffle plate and from thence down under an inner pane of glass carried by the window frame.

Another object of the invention is to provide an improved operating means for this window so that when the outer glass is opened and closed, a pane of glass connected with the outer pane of glass will be also opened and closed.

This invention is illustrated in the accompanying drawings, wherein:—

Figure 1 is a front elevation of the window looking from the inside. Fig. 2 is a vertical sectional view through the window with the ventilator opened. Fig. 3 is a view similar to Fig. 2 with the ventilator closed. Fig. 4 is a section along the line 4—4 in Fig. 2. Fig. 5 is a section along the line 5—5 in Fig. 2. Fig. 6 is a fragmentary sectional view through the upper edge of one of the movable panes of glass to show the protecting strip for the glass.

Referring to the accompanying drawings, it will be seen that this window comprises the frame 10 which is provided with the grooves 11 and 12 in each of its faces, the grooves being positioned at the edges of the openings formed in the center of the frame so that the panes of glass may be mounted in the frame. It is, of course, obvious that these grooves also form seats for the strips 13 which hold the glass in place and form abutments for the movable panes of glass, thus preventing air from passing into the room when the movable panes of glass are closed.

An outer pane of glass indicated by the numeral 14, is mounted in the upper portion of the frame, and an inner pane of glass indicated by the numeral 15 is mounted in the upper portion of the frame, the pane of glass 15 being of greater length than the pane of glass 14, so that when the movable panes of glass are open the air currents which pass beneath the pane of glass 14 will not have a direct passage into the room. It will thus be seen that there has been provided a pocket 16 in the upper portion of the window between the panes of glass 14 and 15 in which the air currents pass, thereby losing a portion of their velocity so that the air currents which enter the room will move with less speed than when they enter the pocket 16.

The pane of glass 17 which forms the baffle plate, has its edges protected by means of a metallic edging 18, the edge at the upper edge of the pane of glass being provided with an inwardly extending lip 19. The lower edges of the panes of glass 14 and 15 are also provided with the edges 18 and with the lips 19. These edges 18 which are carried by the panes of glass 14 and 15 not only protect the edges of the glass, but also act as supports to help support the weight of the glass, the edges being provided with feet 20 through which securing screws may be passed so that the edging may be connected with the window frame 10. A shorter pane of glass 21 is mounted beneath the pane of glass 15 and guides the air currents into the room when the glasses 17 and 21 are opened. It should be noted that this glass is also provided with edges 18 and the lip 19 so that the contacting edges of the glasses 14, 15, 17, and 21, respectively will be protected from being broken when operating the window. These panes of glass 17 and 21 are pivotally mounted in the lower portion of the window and are provided with the arms 22 and 23 which extend into the space between these panes of glass at an upward angle. The arms have their inner ends connected by a link 24 which is pivotally connected with the arms so that when the baffle plate 17 is drawn inwardly the link 24 will be rocked from the position shown in Fig. 3 to that shown in Fig. 2 thus drawing the pane of glass 21 to the position shown in Fig. 2 and permitting air currents to pass into the room. In a like manner, when the baffle plate is moved from the position shown in Fig. 2 to that shown in Fig. 3, the link will be rocked from the position shown in Fig. 2 to that shown in Fig. 3 thus moving the plate 21 to close the opening beneath the pane of glass 15.

A pocket 25 is formed in one side of the window frame between the panes of glass 14 and 15 near the lower edge of the pane of glass 14, and a lever 26 is pivotally mounted adjacent to the outer end of this pocket 25 with its outer end extending into the room. A link 27 is pivotally connected with the lever 26 and with a pivot ear 28 carried by the pane of glass 17 so that when the lever is moved from the position shown in Fig. 3 to that shown in Fig. 2, the baffle plate 17 will be moved to the position shown in Fig. 2 thus drawing the guiding plate 21 to the position shown in Fig. 2. A screen 29 is pivotally mounted upon the shaft 30 so that when the baffle plate 17 is swung inwardly, the screen may be raised as shown in Fig. 2 to prevent dirt and dust from being blown into the room.

The shaft 30 rotates with the lever 26 so that when the lever 26 is moved, an arm similar to the lever 26 entirely mounted within the pocket 25 will also move, thus drawing its link 31 which is similar to the link 27, and thereby causing the window to operate easily and not having a twisting action which would be liable to cause the baffle plate and pane of glass 21 to bind.

When the window is closed it appears as shown in Fig. 3 that when it is desired to ventilate the room, the lever is moved from the position shown in Fig. 3 to that shown in Fig. 2 so that the baffle plate will be swung inwardly thus also drawing the guiding plate 21 to the position shown in Fig. 2. The air currents strike the baffle plate 17 and are guided by the plate up into the pocket 16 through which they circulate and then pass down between the baffle plate 17 and the lower portion of the pane of glass 15 until they strike the sloping guide plate 21 which guides them out into the room. It will thus be seen that a rather tedious journey must be performed in order for the air to reach the interior of the room and, therefore, the velocity of the air current is greatly reduced, therefore, preventing any draft. It is, of course, obvious that this glass arrangement may be mounted in a stationary frame or may be mounted in a frame which is slidable in the window casement so that, if desired, the holding frame may be raised similar to the manner in which an ordinary window is raised.

Having thus described the invention, what is claimed as new, is:—

1. A window comprising a frame, stationary plates mounted in the upper portion of said frame and forming an air pocket between said plates, a baffle plate mounted in said frame beneath one of said first mentioned plates and pivotally connected at its lower edge with said frame, a guiding plate mounted in said frame beneath the remaining one of said first mentioned plates and having its lower edge portion pivotally connected with said frame, and means for swinging the upper portions of said last mentioned plates into the space between said stationary plates whereby air striking said baffle plate will be guided up into the space between said first mentioned plates and will then pass downwardly between said baffle plate and the inner one of said first mentioned plates and be guided out beneath the inner one of said first mentioned plates by said guiding plate.

2. A window comprising a frame, stationary plates mounted in the upper portion of said frame in spaced relation, one of said stationary plates being of greater length than the remaining one, movable plates pivotally mounted at their lower edges to said frame beneath said stationary plates and adapted to close the space beneath said stationary plates, and means for swinging the upper portions of said movable plates into the space between said stationary plates.

3. A window comprising a casing, stationary plates mounted in said casing in spaced relation, one of said stationary plates being of greater length than the remaining one, movable plates mounted in said casing beneath said stationary plates and pivotally connected at their lower edge portions, means for swinging one of said movable plates from a closed position into the space between said stationary plates, and means connecting said movable plates whereby the moving of one of said movable plates from a closed to an open position will cause the remaining movable plate to be moved from a closed position into the space between said stationary plates.

4. A window comprising a frame, stationary plates mounted in the upper portion of said frame in spaced relation, a baffle plate mounted in said frame beneath one of said stationary plates and pivotally connected at its lower edge portion with said frame, a guiding plate mounted in said frame beneath the remaining one of said stationary plates and pivotally connected at its lower edge portion with said frame, inclined arms extending from the lower end portions of said movable plates, a link pivotally connecting the arms of said movable plates whereby the moving of one of said movable plates from a closed to an open position will cause the remaining movable plate to be moved from a closed to an open position, and means for moving said first mentioned movable plate from a closed to an open position.

5. A window comprising a frame, stationary plates mounted in the upper portion of said frame in spaced relation, a baffle plate pivotally mounted in the lower portion of said frame beneath one of said stationary plates, a guiding plate pivotally mounted in the lower portion of said frame beneath the remaining stationary plate, a shaft mounted in said frame between said stationary plates and adjacent the lower edge of the outer one, a screen mounted upon said shaft and resting upon the upper edge of said baffle plate when said baffle plate is in an open position, a lever, an arm connecting said lever with said baffle plate for swinging the same into the space between said stationary plates, arms extending from said movable plates, and a link connecting the arms of said movable plates.

In testimony whereof we hereunto affix our signatures in presence o ftwo witnesses.

HENRY C. MARKOWSKI.
HARRY B. WITTKOWSKI.

Witnesses:
STANLEY JACKOWSKI,
JOHN MITRIKILWICZ.

Copies of this patent may be obtained for five cents each, by addressing the "Commissioner of Patents, Washington, D. C."